Jan. 18, 1966 A. E. MARTENS 3,230,471

BIAS CONTROL

Filed Aug. 10, 1961

INVENTOR.
ALEXANDER E. MARTENS
BY Frank C. Parker
Arthur L. Nelson
ATTORNEYS 3,230,471

BIAS CONTROL

Alexander E. Martens, Greece, N.Y., assignor to Bausch & Lomb Incorporated, Rochester, N.Y., a corporation of New York Filed Aug. 10, 1961, Ser. No. 130,592
1 Claim. (Cl. 330—204)

This invention relates to a bias control for an amplifier and more particularly to means for noise-free switching of an electrical signal.

An audiometer provides a means for conducting hearing tests which indicate the acuity of hearing of the person being tested. In conducting hearing tests various frequencies are employed with a means for switching from one frequency to another. The volume of the tone may also be varied to provide a means for detecting the ability of the person to hear sounds of different intensity. In the process of conducting the hearing test it is necessary that a tone interruption may be accomplished without introducing any noise frequencies which might indicate to the person being tested that the such interruption has taken place. If this precaution is not employed, the accuracy of the test may be impaired. The use of this device in an audiometer is an example of its application however, the inventor does not wish to limit the invention to this use as the device may be used in any signal switching circuit.

Accordingly, this invention is intended to provide a means for controlling the output of an amplifier. A switching circuit in the amplifier creates a high negative bias cutting off the amplifier in such a manner that no signal or undesirable noise is detectable in the output of the circuit.

It is an object of this invention to provide a bias control circuit combined with noise-free switching in the control grid circuit.

It is a further object of this invention to provide an output control circuit in the amplifier which will not appreciably affect or load the source of the input signal during the output signal switching.

It is a further object of this invention to provide a noise-free switching means in the output circuit permitting continued signal generation in the signal source.

It is a further object of this invention to cut off the output signal from the amplifier by permitting a partial charge of a capacitor to avoid high initial charging current as the capacitor charges negatively to cut off conduction of the output stage or stages in the amplifier.

It is a further object to place a high negative bias on the tube when it is cut off and permit operation of tube through partial discharge of a capacitor subsequent to turning on the tube operation.

The objects of this invention are accomplished by providing a grid control circuit for cutting off the plate current conduction exponentially on the amplifier tube. The grid control includes a switch between the control grid of the amplifier and ground. A high negative potential is connected through three resistors and the switch in the grid circuit to ground. A large resistive component is connected between the negative potential and intermediate resistors in the grid circuit. In this manner a small negative voltage with respect to cathode is created on the grid to provide an appropriate bias during normal conduction of the amplifier tube. In this position the switch is closed.

As the switch is opened a capacitor which is partially charged during normal operation of the amplifier tube is then permitted to completely charge exponentially to the voltage level of the high negative bias voltage source. The amplifier tube is cut off exponentially due to the impression of a high negative potential as the capacitor charges. Due to the partial charging of the capacitor and the positioning of the negative potential, the amplifier tube is cut off with a minimum of noise or distortion transmitted to the output circuit.

As the switch is closed, initially a high negative potential is present on the grid control circuit. Consequently no signal or noise is transmitted through the amplifier tube to the output circuit. The capacitor discharges through a grid resistor to restore a normal bias and permit conduction of the tube. The increase in the plate conduction is exponential. The signal from the signal source being impressed on the control grid is thus permitted to be amplified by the amplifier tube, and appears in the output.

The following illustrations and description set forth the preferred embodiment of this invention. Any modifications of the preferred embodiment within the principle as illustrated and described in the following paragraphs are considered to be within the scope of the invention.

Figures 1, 2:
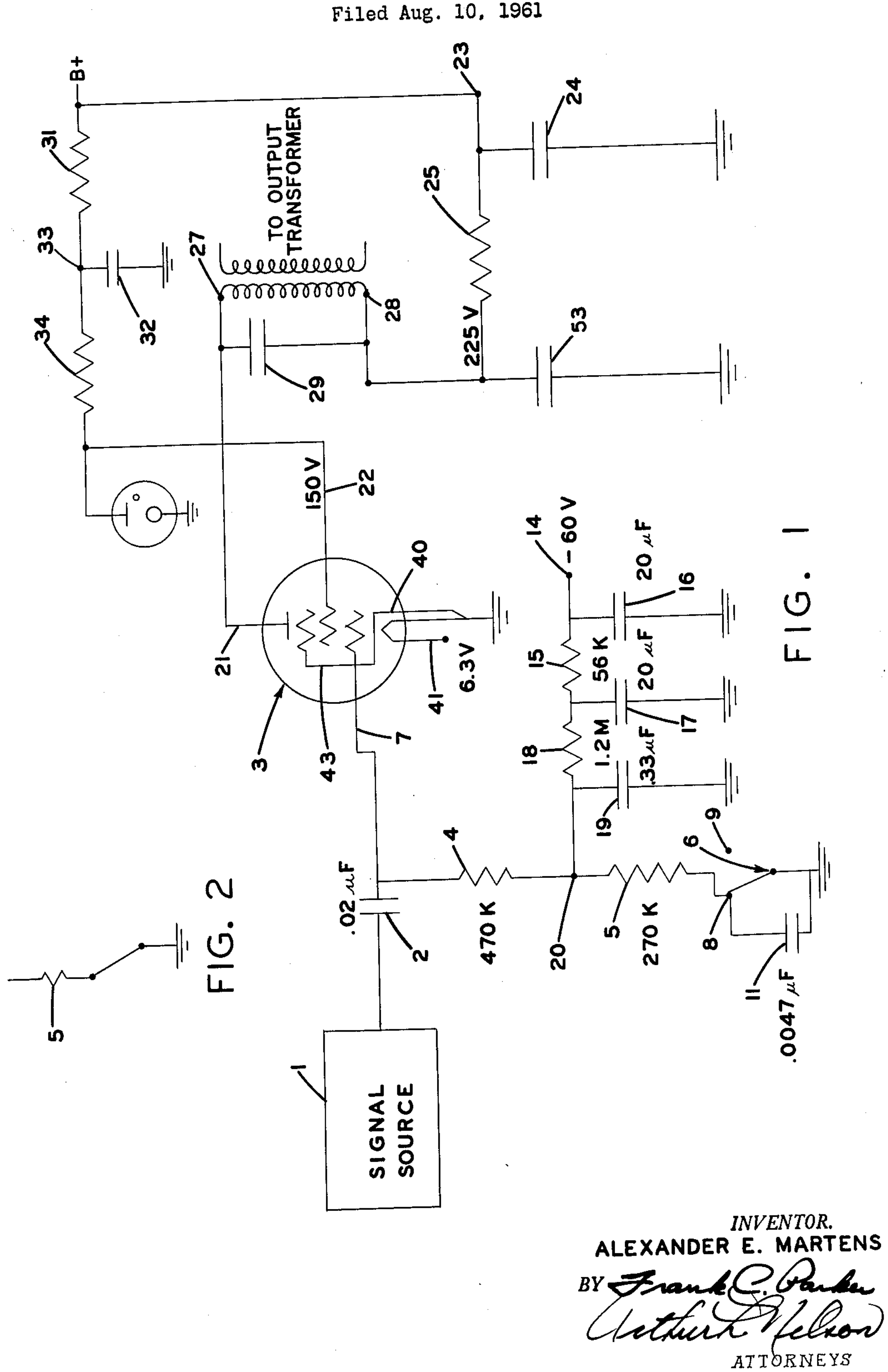
FIG. 1 illustrates an amplifier circuit connected to signal source and an output circuit.
FIG. 2 is a modified switch circuit.

Referring to the drawings the signal source 1 may be an oscillator of any type, but will be subsequently described as a signal generator, which generates an audio signal. The oscillator is intended to remain in oscillation regardless of interruptions in the amplifier circuit. By maintaining a continuous oscillation in the oscillator a uniformity in output may be achieved. The disadvantage in cutting off the oscillator is that a limited period of time is required for the oscillator to again gain full oscillation of the amplitude and frequency desired. By placing the cut-off in the amplifier circuit these variables are eliminated.

The audio frequency is passed through the capacitor 2 in the grid circuit of the amplifier tube 3. The grid circuit includes the resistors 4 and 5 which are connected through the switch 6 to ground. A signal is passed through the capacitor 2 and impressed across the resistors 4 and 5 to transmit a signal to the grid 7.

The switch 6 has two contacts 8 and 9 for alternatively engaging the arm of the switch. Capacitor 11 is connected between contact 8 and ground. The capacitor 11 is a small capacitor in the order of .0047 microfarad. This capacitor suppresses parasitic noises due to arcing of the switch 6 as it is being opened and closed.

The grid circuit is negatively biased through a source of a negative potential of —60 volts. The negative potential may be impressed by a rectifier connected between ground and the terminal 14. The rectifier output is filtered through the filtering circuit comprising the resistor 15 and the capacitors 16 and 17. The filtered voltage is then connected through the resistor 18 to a point intermediate of the grid resistors 4 and 5. The point intermediate of grid resistors 4 and 5 is also connected to the capacitor 19 which is connected on its opposite end to a ground potential. The source of negative potential of —60 volts is impressed across the capacitor 16. The resistors 15, 18 and 5 are connected through the switch 6 to a ground potential. The bleeder current passing through these resistors creates a negative voltage of approximately 6 volts at the connection 20 between the resistors 4 and 5. Minus 6 volts is the negative potential impressed on the grid circuit at this point. This is the correct operating bias during normal conduction of the amplifier tube 3.

The plate 21 and screen grid 22 are connected to the B+ through appropriate resistance networks. Screen voltage is stabilized at 150 volts to stabilize the amplitude of the output. The B plus is applied through a conventional rectifier circuit connected at the terminal 23. The capacitor 24 is connected across the rectifier output and ground. The output of the rectifier not shown, is filtered through the filtering network of the resistor 25, the capacitor 24 and capacitor 53. This filtering network supplies the plate voltage for the plate 21. The output circuit for the plate 21 is connected to the terminals 27 and 28 across which the capacitor 29 is connected. The output terminals 27 and 28 are connected to suitable output transformer for the output of the amplifier.

The screen circuit includes the filtering network of the resistor 31 and capacitor 32. The terminal 33, is connected to the resistor 34. The resistor 34 is connected to the screen 22. A gas discharge regulator tube maintains the voltage fixed on the screen 22, thus making the output of the tube to a large degree independent of any B+ variations due to the particular tube characteristics.

During normal conduction of the amplifier tube 3, the switch 6 is connected to the terminal 8 in the grid circuit. This connects the grid resistors 4 and 5 to ground through the switch 6. The signal from the oscillator 1 is fed through the capacitor 2 and impressed across the resistors 4 and 5. The signal in this manner is impressed on the grid 7 of the amplifier tube 3. The cathode 40 is connected directly to ground. The filament voltage is impressed across the filament 41. A beam power tetrode, as illustrated, has a beam forming plate 43 connected to the cathode 40.

A negative voltage of approximately 6 volts is created by the negative source of potential —60 volts across the capacitor 19 as indicated. This is the negative bias impressed on the control grid 7 during normal operation. As this signal is fed into the grid 7, the tube conducts and an output signal voltage is created on the terminals 27 and 28 across the primary of an output transformer, shunted by the capacitor 29.

When it is desired to cut off the output signal the switch 6 is transferred from the contact 8 to the contact 9. A limited arcing is generally present in breaking a circuit through a switch. For this reason the small capacitor 11 is connected to contact 8. The parasitic noises are substantially reduced by the capacitor as the switch is thrown from one terminal to another. The suppression of parasitic noises by the capacitor however, is not sufficient to completely eliminate output noise which may indicate to the patient that signal is being turned on or off. For this reason the grid circuit as illustrated in the drawing is also employed.

When the switch 6 is opened the capacitor 11 and the capacitor 19 immediately begin charging. The charging current for capacitor 19 passes through the resistors 15 and 18. The capacitor 11 also charges through resistors 15, 18 and 5. This places a high negative potential on the terminal 20. The capacitors 19 and 11 charge exponentially to approximately minus 60 volts. With a negative bias of —60 volts on the terminal 20, the control grid 7 cuts off conduction of the tube 3. The charge of negative potential on the terminal 20 is quite rapid and therefore cutting off the tube in a short period of time. The rise and decay times on the tube conduction may be easily controlled by selection of suitable values for R18, R5 and C19.

The amplifier tube conduction is initiated when the switch 6 is closed as the switch arm engages the contact 8. The high negative potential is present on the terminal 20 at the time the switch is closed, and the tube is not conducting, therefore, no signal can be reproduced in output circuit. The arm shunts the capacitor 11 in this position. The capacitor 19 discharges through the resistor 5 reducing the negative potential on the terminal 20. The discharge time is controlled by the value of the capacitor 19 and resistance 5. With the partial discharging of the capacitor 19 a minus 6 volt bias is again established on the terminal 20 and the tube fully conducts.

In this manner it can be seen that the switching in the grid control circuit creates practically no overshoots or undesirable noise in the output circuit which may be objectionable in this type of electronic device. The values as indicated on the drawing are not necessarily limiting in this disclosure. The values have merely been included to indicate a circuit for the purpose of description and its operation.

The invention has been illustrated and described in the preceding paragraphs. The following claim defines the scope of this invention.

I claim:

An audiometer interrupter circuit comprising, an electron control device including a control element for amplifying an audio signal, an audio oscillator coupled to the control element of said electron control device, a bias control circuit including, a switch having two terminals with the first terminal connected to a neutral potential, a first and second resistor connected in series between the control element of said electron control device and to the second terminal of said switch, a resistance connected to a high negative potential and the junction of said two resistors to provide an operating bias potential on the control element of said electron control device when said switch is closed, a first capacitor connected between the neutral potential and the junction of said two resistors charging to the high negative potential when the switch is open, a second capacitor connected between said second resistor and the neutral potential to eliminate parasitic noises during closing of said switch, said switch thereby selectively and alternately placing an operating potential on said control element of the electron control device when said switch is closed, and allowing said capacitors to exponentially charge and thereby cut off operation of said electron control device by placing a high negative potential on the control element when said switch is open.

References Cited by the Examiner

UNITED STATES PATENTS

| | | | |
|---|---|---|---|
| 2,375,283 | 5/1945 | Cloud | 330—130 X |
| 3,010,028 | 11/1961 | Meyerhoff et al. | 307—88.5 X |

OTHER REFERENCES

Schreiber, 1,023,957, Feb. 6, 1958, German application.

ROY LAKE, *Primary Examiner.*

ARTHUR GAUSS, *Examiner.*